(12) United States Patent
Bouat

(10) Patent No.: US 10,929,429 B2
(45) Date of Patent: Feb. 23, 2021

(54) FLEXIBLE SUBSCRIBER DATA ABSTRACTION LAYER

(71) Applicant: HEWLETT PACKARD ENTERPRISE DEVELOPMENT LP, Houston, TX (US)

(72) Inventor: Sebastien Bouat, St. Martin d'Uriage (FR)

(73) Assignee: Hewlett Packard Enterprise Development LP, Houston, TX (US)

( * ) Notice: Subject to any disclaimer, the term of this patent is extended or adjusted under 35 U.S.C. 154(b) by 185 days.

(21) Appl. No.: 15/969,903

(22) Filed: May 3, 2018

(65) Prior Publication Data
US 2019/0340268 A1  Nov. 7, 2019

(51) Int. Cl.
*G06F 16/27* (2019.01)
*G06F 21/62* (2013.01)
*G06F 16/23* (2019.01)

(52) U.S. Cl.
CPC .......... *G06F 16/27* (2019.01); *G06F 16/2365* (2019.01); *G06F 21/6218* (2013.01)

(58) Field of Classification Search
CPC ..................................................... G06F 16/27
USPC .......................................................... 707/791
See application file for complete search history.

(56) References Cited

U.S. PATENT DOCUMENTS

| | | | |
|---|---|---|---|
| 6,601,192 B1 * | 7/2003 | Bowman-Amuah | G06F 11/3688 714/38.12 |
| 7,478,397 B1 * | 1/2009 | Borries | G06F 8/20 719/311 |
| 7,937,460 B2 * | 5/2011 | Vaught | G06Q 30/04 709/223 |
| 8,929,876 B2 | 1/2015 | Lee et al. | |
| 10,331,471 B1 * | 6/2019 | Viktorov | G06F 9/45558 |
| 2003/0235182 A1 | 12/2003 | McMullin | |
| 2009/0077011 A1 * | 3/2009 | Natarajan | G06F 16/24532 |
| 2009/0327401 A1 * | 12/2009 | Gage | G06F 15/16 709/203 |
| 2010/0174620 A1 * | 7/2010 | Stringfellow | G06Q 20/02 705/26.1 |
| 2014/0108245 A1 * | 4/2014 | Drummond | G06F 3/023 705/43 |
| 2017/0201523 A1 | 7/2017 | Palmer et al. | |
| 2017/0255373 A1 * | 9/2017 | Bruno | G06F 11/3058 |
| 2018/0176017 A1 * | 6/2018 | Rodriguez | H04L 63/08 |

OTHER PUBLICATIONS

Reshad, "Should There be a Abstraction Layer Between Database and Model?," Dec. 4, 2013, pp. 1-4 [online], Stack Overflow, Retrieved from the Internet on Feb. 27, 2018 at URL: <stackoverflow.com/questions/20383464/should-there-be-a-abstraction-layer-between-database-and-model>.

* cited by examiner

*Primary Examiner* — Syling Yen
(74) *Attorney, Agent, or Firm* — Nolte Lackenbach Siegel

(57) ABSTRACT

A method for providing a subscribed service includes: receiving a service request at a service; accessing, at a subscriber data abstraction layer interposed between the service and the subscribed database, subscriber data from a subscriber database; and processing the service request using the accessed subscriber data.

19 Claims, 5 Drawing Sheets

FLEXIBLE SUBSCRIBER DATA ABSTRACTION LAYER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Many computing environments include what are known as "subscriber services". Perhaps the most well-known and ubiquitous are the mobile communications services such as those for smart phones and/or tablets, for example. Smart phones may be used for text messaging, video chatting, emailing, voice calling, and video streaming. Each of these is a "service" and such services may be implemented in all kinds of computing devices today and not just smart phones.

When the user invokes a service, the service application on their computing apparatus (e.g., a smart phone) sends a "service request" to the service. The service resides on the service provider's network. This network also includes large databases of subscriber information stored as subscriber information. For example, before the service fulfills the request, it checks the information in the subscriber databases to find out if the user's subscription includes the rights encompassed by the request. If so, the service fulfills the request. If not, the request is denied.

BRIEF DESCRIPTION OF THE DRAWINGS

Examples described, herein may be understood by reference to the following description taken in conjunction with the accompanying drawings, in which like reference numerals identify like elements.

While examples described herein are susceptible to various modifications and alternative forms, the drawings illustrate specific embodiments herein described in detail by way of example. It should be understood, however, that the description herein of specific embodiments is not intended to be limiting to the particular forms disclosed, but on the contrary, the intention is to cover all modifications, equivalents, and alternatives falling within the spirit and scope of the examples described herein and the appended claims.

DETAILED DESCRIPTION

Illustrative embodiments of the subject matter claimed below will now be disclosed. In the interest of clarity, not all features of an actual implementation are described in this specification. It may be appreciated that in the development of any such actual embodiment, numerous implementation-specific decisions may be made to achieve the developers' specific goals, such as compliance with system-related and business-related constraints, which will vary from one implementation to another. Moreover, it may be appreciated that such a development effort, even if complex and time-consuming, would be a routine undertaking for those of ordinary skill in the art having the benefit of this disclosure.

In conventional practice, there are already installed bases of service providers with large customer subscriber bases. Each of these subscriber databases is very large and contains a lot of data. The information they contain is proprietary as is the data model they employ. Each of these subscriber databases may use a different data model for the data they contain.

Furthermore, services are designed to be used multiple times with multiple customers, and so will usually be used in conjunction with many subscriber databases. However, services will frequently use a different data model than do the subscriber databases, making communications between the two difficult to implement. Exacerbating the difficulties is that the service providers who own the subscriber databases are frequently contractually prohibited from modifying the services to address these difficulties. However, even were that not true, attempts to modify the services may also damage the ability of the service to be used across multiple customers' subscriber databases.

Figure 1:
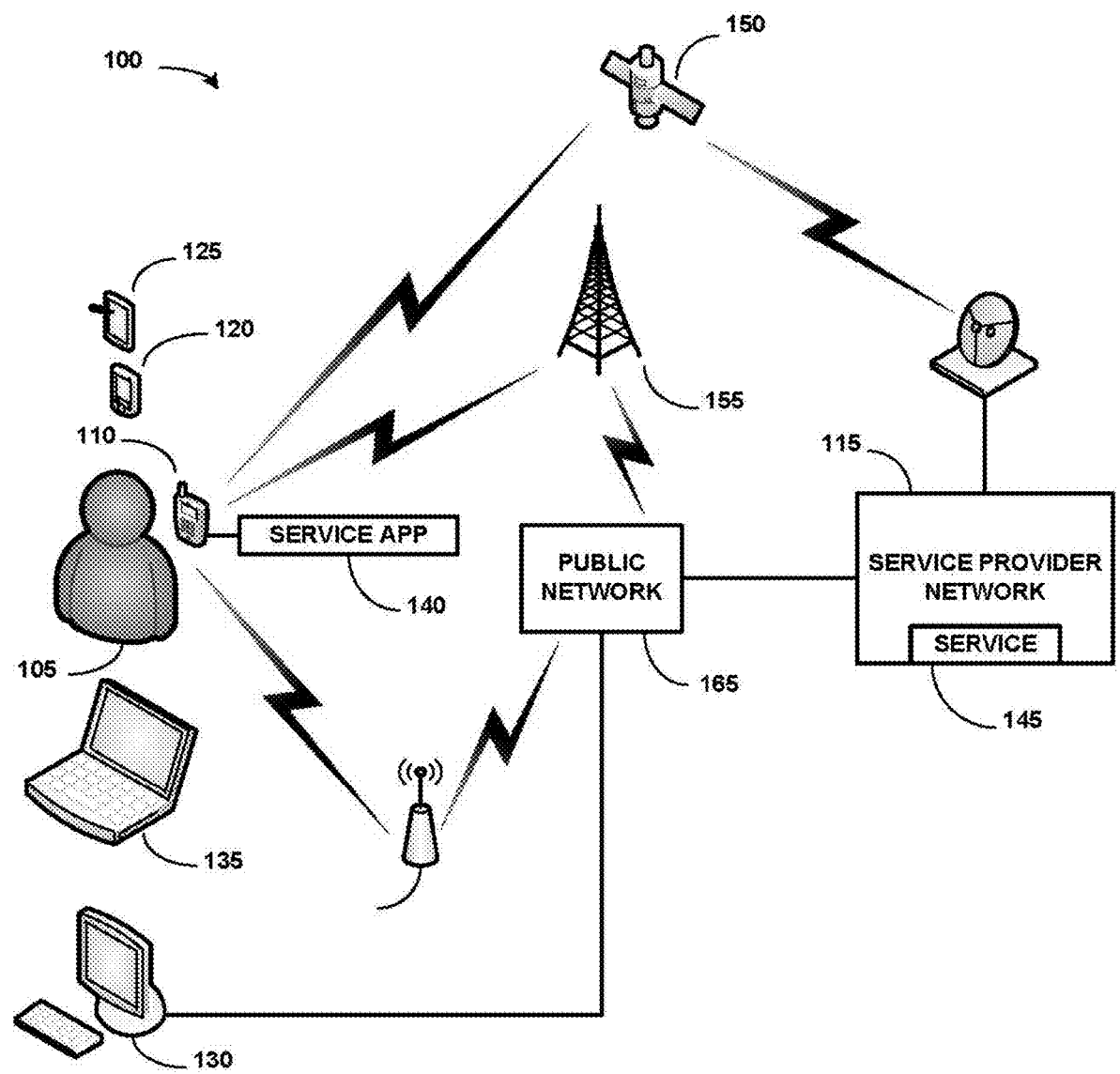
FIG. 1 conceptually depicts one example of a computing environment in which the subject matter claimed below may be deployed.

FIG. 1 conceptually depicts one example of a computing environment 100 in which the subject matter claimed below may be deployed. The computing environment 100 includes a user 105 with, a computing apparatus 110 and a service provider network 115. In this particular embodiment, the computing apparatus 110 is a smart phone. In alternative embodiments, it could be virtually any kind of computing apparatus such as, without limitation, a personal digital assistant 120 ("FDA"), a tablet 125, a desktop computer 130, or a laptop computer 135.

The user 105 invokes a service application 140 on the computing apparatus 110, which then sends a service request to a service 145 residing on the service provider network 115. Those in the art having the benefit of this disclosure will appreciate that an "application" is usually considered to be something different from a "service". In general, applications are invoked by end users such as the user 105, implement a relatively wider range of functions than a service, and frequently they call one or more services. A service, on the other hand, is usually tailored to a narrower range of functions and is usually used by other programs such as, applications, for example. As used herein, the term "service application" is used to identify an application that calls a service.

The manner in which the service request is transmitted to the service 145 may vary widely depending upon the particular implementation. Since the computing apparatus 110 in the illustrated embodiment is a smart phone, the request may be sent wirelessly, either by satellite 150, by radio signal through a radio signal tower 155, or using a technology such as WiFi™ or Bluetooth™ through a wireless access point 160. Or, the connection may be hardwired, as is the desktop computer 130 to a public network 165. In addition to direct transmission and transmission through a public network 165 (e.g., the Internet), some embodiments may transmit over a private network such as a cellular telephony network (not shown), or even a virtual private network ("VPN") (not shown) established on the public network 165. The manner in which the service request is transmitted to the service 145 is not material.

Figure 2:
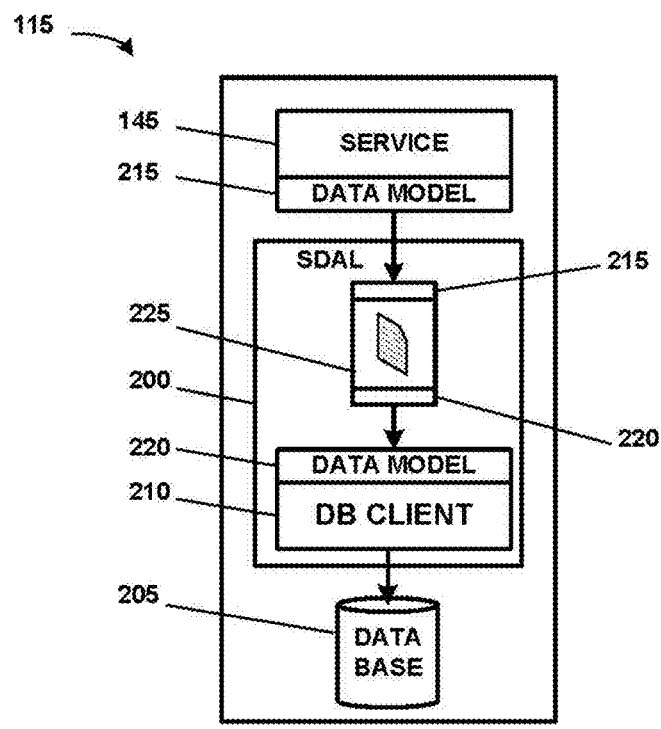
FIG. 2 conceptually depicts one particular embodiment of a software architecture in accordance with the technique disclosed herein illustrating the functional relationship between the various components of a service provider network.

Turning now to FIG. 2, the service provider network 115 is usually a distributed computing environment. FIG. 2 conceptually illustrates the functional relationship between the various components in one particular embodiment. The service provider network 115 includes the service 145, a subscriber data access layer ("SDAL") 200 interposed between the service 145 and the subscriber database 205, and a database client 210. The SDAL 200 decouples the services definition and implementation for the service 145 from the data model of the subscriber database 205.

Figure 3:
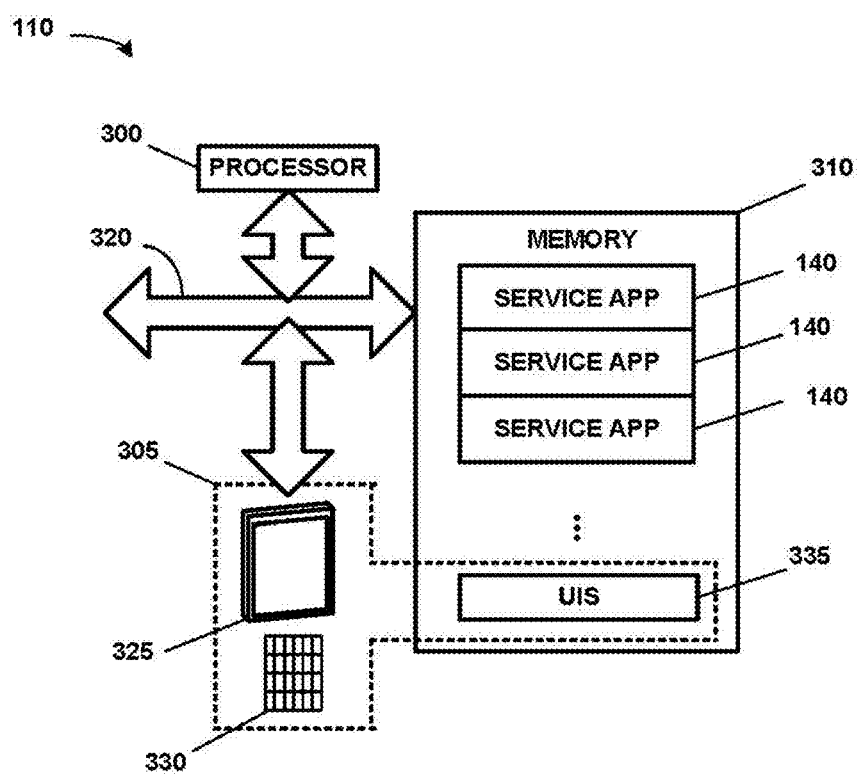
FIG. 3 illustrates an example of selected portions of a hardware and software architecture of a computing apparatus from which the service may be invoked.

Returning to FIG. 1, the computing apparatus 110 will usually be self-contained although this is not necessarily the case in all embodiments. FIG. 3 illustrates an example of selected portions of the hardware and software architecture of such a computing apparatus 110 in one particular embodiment. More particularly, FIG. 3 depicts selected portions of the hardware and software architecture of the computing apparatus 110. Many structural details well known in the art have been omitted to avoid obscuring that which is shown.

The computing, apparatus 110 includes a processor 300, a user interface 305, a memory 310, and a communications medium 320. Since, in the illustrated embodiment, the computing apparatus 110 is a smart phone, the processor 305 may be any one of a class of processors especially developed for mobile applications. The memory 310 stores a number of software components that may be invoked and executed by the processor over the communications medium 320.

The communications medium 320 will usually be a bus in the illustrated embodiment since, again, the computing apparatus 110 in this embodiment is a smart phone. The bus will employ some kind of protocol particular suitable for this kind of context such as Mobile PCI Express ("M-PCIe"). The memory 310 will also be of a design tailored for mobile applications particularly with respect to low power consumption and small physical size. It will nevertheless include a mix of read only memory ("ROM"), random access memory ("RAM") and removable memory such as a subscriber identity module ("SIM") card, none of which is expressly shown.

The user interface 305 includes a display 325, an alphanumeric keypad 330, and a user interface software component ("UIS") 335 residing in the memory 310. Some embodiments might employ peripherals such as stylus (not shown). The display 325 will usually be a touch screen, light emitting diode ("LED") or organic LED ("OLED") display of some kind. The user interface 305 will usually also include a graphical user interface ("GUI") displayed to the user 105 on the display 325.

Finally, the software components residing in the memory 310 include one or more service applications 140. Each service application 140, upon invocation by the user 105 and execution by the processor 300, imparts a functionality to the computing apparatus 110. For example, one service application 140 may implementing a text messaging functionality while another implements an emailing functionality. Other examples of functionalities performed by the service applications 140 include voice calling, video chatting, navigation, video streaming, etc.

However, alternative embodiments of the computing apparatus 110 may employ different hardware and software architectures. These alternative embodiments may use different kinds of processors, bus protocols, and memory designs. The desktop computer 130, for example, will use one or more of a different class of processors designed for desktop units. Similarly, freed from the constraints of low power consumption and physical size, the memory design will significantly differ. However, the memory in such designs will still host one or more service applications 145 that perform in manner analogous to those shown in FIG. 3 and discussed herein.

Figure 4:
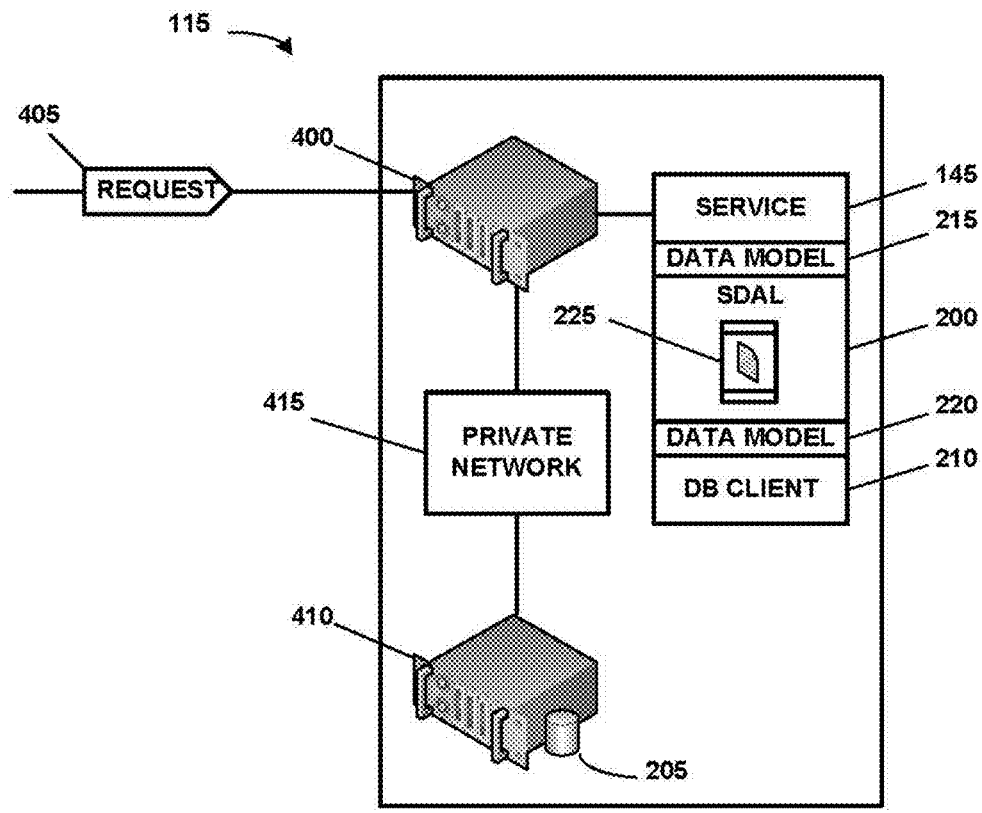
FIG. 4 conceptually depicts one particular example of a distributed computing environment in which the service provider network of FIG. 3 might be implemented in some embodiments.

Turning now to FIG. 4, one particular example of a distributed computing environment in which the service provider network 115 might be implemented is illustrated. Those in the art having the benefit of this disclosure will appreciate that this is but one way to implement this computing environment, particularly in terms of physical implementation. However, the software architecture and functionality as may be discussed below relative to FIG. 2 may be consistent across embodiments.

In the illustrated embodiment, the service provider, network 115 may include a server 400 that receives the service request 405 and communicates with a database server 410 over a private network 415. The service 145, SDAL 200, and database mine 210 in this particular embodiment reside on the server 400. The database 205 resides on the database server 410. The situs of the service 145, the SDAL 200, the database client 210, and the subscriber database 205 within the service provider network 115 is not material to the practice of the technique disclosed herein, however.

Figure 5:
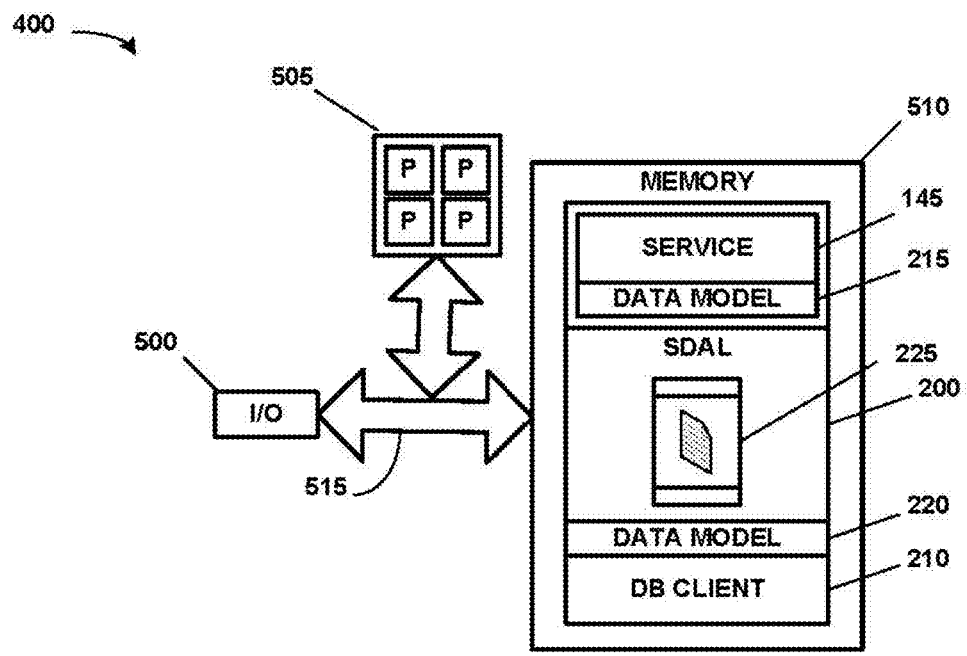
FIG. 5 shows selected portions of the hardware and software architecture for the communications server first shown in FIG. 4.

FIG. 5 shows selected portions of the hardware and software architecture for the server 400 in FIG. 4. The server 400 includes an input/output ("I/O") interface 500 through which the service request 405, shown in FIG. 4, is received. The server 400 includes a processor set 505 including a plurality of processors "P" in a manner known in the art and a memory 510. As mentioned above, the service 145, the SDAL 200, and the database client 210 reside in the memory 510. The memory 510 includes a combination of read-only memory ("ROM") and random access memory ("RAM"). The I/O interface 500, processor set 505, and memory 510 communicate over a communications medium 515. The communications medium 515 will usually be a bus using some well-known bus protocol such as Peripheral Component Interface-express ("PCIe").

Upon receipt of the service request 405 through the I/O interface 500, the processor set 505 invokes the service 145 over the communications medium 515. The service 145 then begins the process of evaluating the service request 405 and determining whether to honor it. This process includes accessing the subscriber database 205 residing on the server 410 through the SDAL 200 using the wrapper 215 and the database client 210 in a manner to be discussed more fully below.

Figure 6:
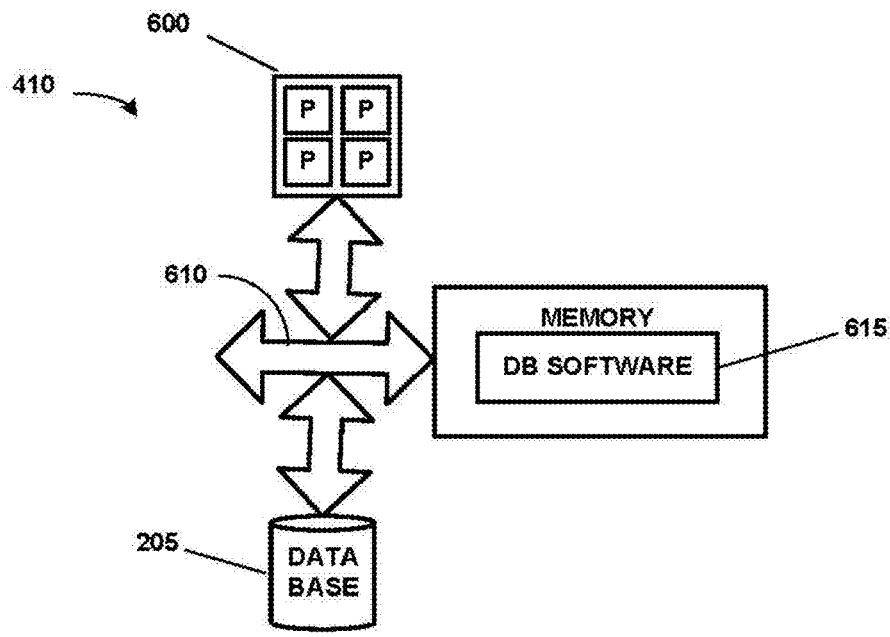
FIG. 6 shows selected portions of the hardware and software architecture for the database server first shown in FIG. 4.

FIG. 6 shows selected portions of the hardware and software architecture of the database server 410. The database server 410 includes a processor set 600 including a plurality of processors "P" communicating with a memory 605 and the subscriber database 205 over a communications medium 610. The communication medium 610 will usually be a bus using some well-known bus protocol such as Peripheral Component Interface-express ("PCIe"). The memory 605 includes a combination of read-only memory ("ROM") and random access memory ("RAM"). The subscriber database 205 usually resides on some kind of backend, mass storage not otherwise shown. The database software 615 associated with the database 215 may reside in the memory 605 or, perhaps, on the mass storage as well.

The processor set 600 responds to requests from the service 145 in terms of access to the subscriber data in the subscriber database 205. As noted above, the processing of the request by the service 145 goes through the SDAL 200. The processor set 600 also manages the subscriber database 205 by execution of the database software 615. However, the physical mechanism by which this occurs may be well understood and readily implemented by those in the art having the benefit of this disclosure. Accordingly, so as not to obscure the subject matter claimed below, further details in this regard will not be disclosed.

Returning now to FIG. 2, the service 145 defines first data model 215 and the database client 210 defines a second data model 220. Although the two data models 215, 220 may be the same in some embodiments, in other embodiment they may not be. A "data model" defines the format and structure of the data with which it is associated. In instances where the first data model 215 and the second data model 220 differ, the difference implies that communications between the service 145 and the database client 210 (as well as the data base 205) may be incompatible unless efforts are made to bridge the difference.

This functionality of bridging the difference between the data models 215, 220 belongs to the wrapper 225 of the SDAL 200 in the illustrated embodiment. Wrappers are known to the computing arts in other contexts. For example, they may be used to improve convenience, compatibility, or security in the course of performing tasks in networking environments. In networks employing the Transmission Control Protocol/Internet Protocol ("TCP/IP") standard, the wrapper is known as the "TCP wrapper" and provides security by determining whether incoming requests are authorized to have access. More particularly, it intercepts service requests to services and determines whether the service is authorized to execute the request.

More precisely, each of the wrapper 225 and the database client 210 "consume" and "produce" two different data models in the course of performing these functions. The wrapper 225 consumes the data model 215 of the inbound data and produces the data model 220 of the outbound data. The database client 205 consumes a data model that is the key of the key-value pair subsequently discussed and produces the data model of the underlying subscriber database 205.

Contrary to conventional practice, the wrapper 225 is segregated into the SDAL 200 which is interposed between the service 145 and the database client 210. The database client 210 is also a departure from conventional practice. In conventional practice, request authorizations are filled by directly accessing the subscriber database 205. The subscriber database 205 is a "subscriber database" such as is known in the art.

The SDAL 200 is shown as including the wrapper 200 and the database client 210. The SDAL 200 is a middleware layer of business logic that calls external resources such as the wrapper 225 and the database client 210. The wrapper 225 may already pre-exist in the service provider network 115 or be custom built and installed with the SDAL 200. So, too, with the database client 210, although it is likely that the database client 210 will be custom built and installed with the SDAL 200. Either way, the database client 210 and the wrapper 225 are "plugged into", or called, by the application programming interface ("API", not shown) of the SDAL 200.

Figure 7:
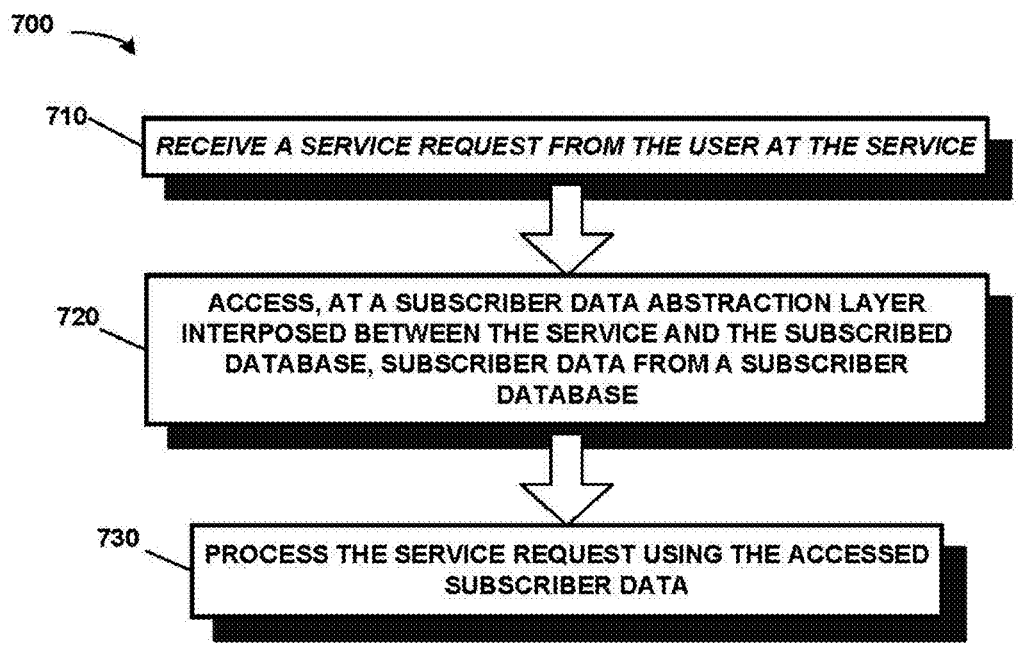
FIG. 7 illustrates one particular embodiment of a method as practiced in accordance with the presently disclosed technique.

FIG. 7 illustrates one particular embodiment of a method practiced in accordance with the subject matter claimed below. The method 700 is for providing a subscribed service 145 to a user 105, and begins by receiving (at 710) a service request 405 from the user 105 at the service 145. The method 700 then accesses (at 720), at a subscriber data abstraction layer interposed between the service and the subscribed database, subscriber data from a subscriber database. The method 700 then proceeds by processing (at 730) the service request using the accessed subscriber data.

Processing (at 730) the service request will depend to some degree on implementation specific details as will the access (at 720). Consider the previously mentioned example involving user authorization. This might only require accessing the subscriber profile, determining from the subscriber profile that the service is authorized, and then authorizing the service. However, other service requests may require more. For example, a user may wish to use a Short Message Service ("SMS"), and the service request might seek to know whether charging of SMS service is prepaid or postpaid in mobile network. This information may be found as an attachment to the subscriber profile in the subscriber database 205. There may be any number of such attachments in varying embodiments. Accordingly, subscriber data might be any profile attribute or property attached to a subscriber and used by service business logic. It need not tied at all to service authorization.

The act of accessing itself will also be implementation specific. There are many APIs that might be used such as Open Database Connectivity ("OBC") which is an standard API for database management systems. Another example might be the Lightweight Directory Access Protocol ("LDAP") an open, vendor-neutral, industry standard application protocol for accessing and maintaining distributed directory information services over an Internet Protocol (IP) network. Still other APIs known in the art may be used in various alternative embodiments.

Figure 8:
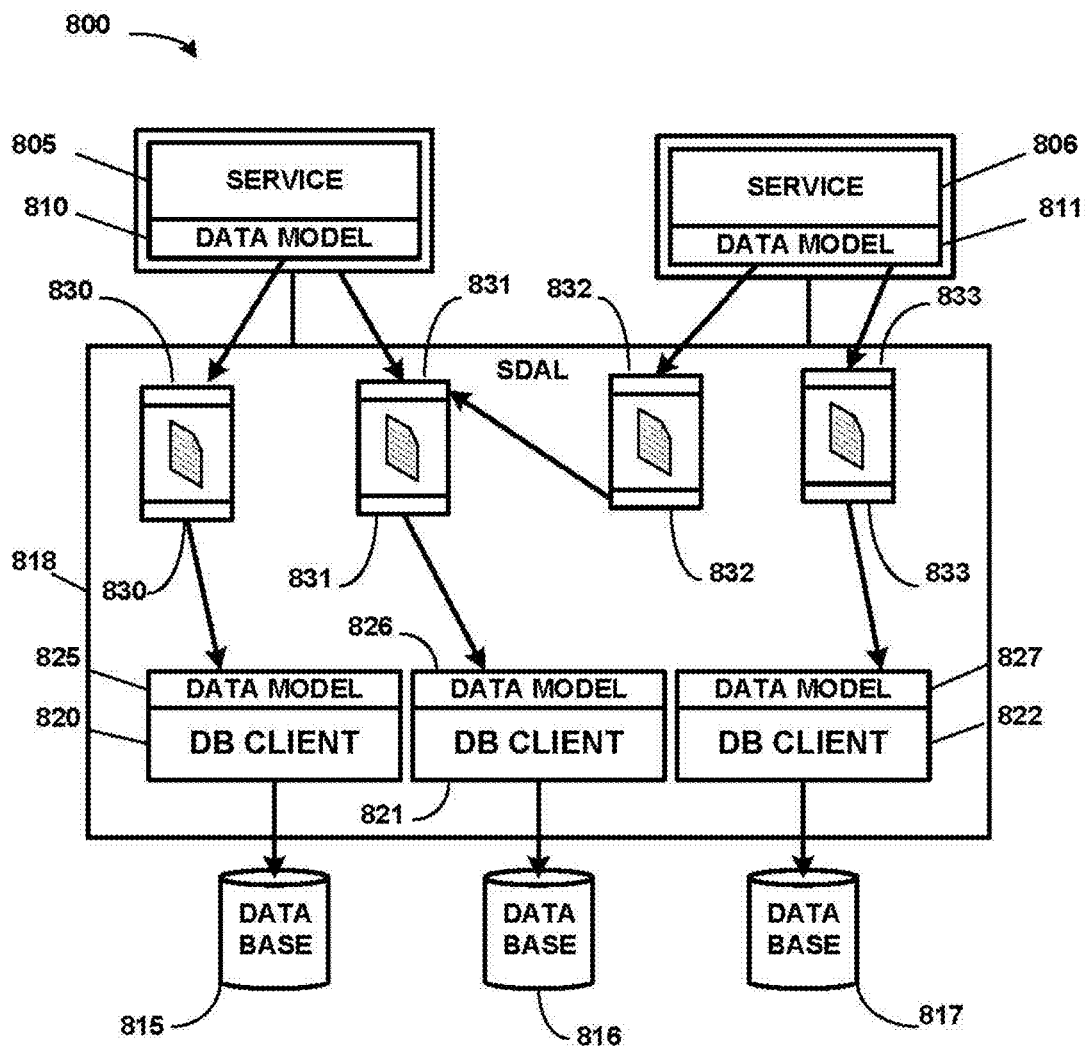
FIG. 8 illustrates selected portions of a software architecture of a service provider network in accordance with one particular embodiment.

Those in the art having the benefit of this disclosure will appreciate that the embodiment disclosed above is more streamlined than what will usually be encountered. FIG. 8 depicts a more complex embodiment. In the service provider network 800, there are two services 805, 806 each defining a respective data model 810, 811. The data models 810, 811 usually only hold those data used by the respective service 805, 806 and differ from one another. In some embodiments with many more services, it is possible that some services will share a data model. The likelihood that some services will share data models will increase with the number of services. Conversely, the likelihood that at least some services will not share a common data model will also Rely rise. The service provider network 800 also includes a plurality of databases 815-817.

Each of the databases 815-817 is a subscriber database containing large amounts of subscriber data, but usually any given one of the services 805-806 will only access small portions of it. The types of subscriber data may be identified by subscriber and will include information related to the services 805-806. For example, returning to the embodiment of FIG. 1 in which the computing apparatus 110 is a smart phone, the use 105 will have a subscription plan for mobile telephone services that may include services such as text messaging, video chat, video streaming, etc. The subscription plan may be tied to the user's phone number and may include other details such as limits on data usage. This information may be stored in one or more of the databases 815-817 as subscriber data and keyed to the telephone number of the user 105.

Still referring to FIG. 8, the service provider network 800 includes a respective database client 820-822 for each of the data bases 815-817, Each database client 820-822 holds the method for accessing to the respective database 815-817 and publishes the respective data model 825-827 of this database 815-817. In the embodiment in which the computing apparatus 110 is a smart phone, the subscriber data models 820-822 are usually pretty simple with a key-value pair semantic. The key is the phone number of the user 105 (i.e., the subscriber) and the value is the data attached to that subscriber. Similar tactics can be used in other contexts. For example, if the computing apparatus is an International Mobile Subscriber Identity ("IMSI") handset, the IMSI identifier may be used.

The service provider network 800 also includes an SDAL 818 further including of a plurality of wrappers 830-833. The wrappers 830-833 convert one data model into another data model. The wrappers 830-833 usually perform operations such as formatting a data (for instance data X has binary representation on one side, and displays as text on the other side) and aggregation/split of data. Note that the wrappers 830-833 can call other wrappers 830-833 if needed to perform the correct conversion as shown in FIG. 8. Service 806 wishes to access the database client 821 with the data model 826, but there is no available wrapper for that conversion. So the service 806 calls the wrapper 832 which then calls the wrapper 831 for the conversion to make the access.

In the illustrated embodiment of FIG. 8, the SDAL 200 and the database clients 825-827 are all implemented in Java. For example, the service 805-806 may be implemented as Java beans—i.e., a basic class with only getters and setters and a few annotations. The wrappers 830-833 may also be implemented as Java beans. In the illustrated embodiment, the key-value is represented as a basic get (Key):Value method. The database clients 820-822 may also be a third class of Java beans.

As noted above, the databases 815-817 usually represent an installed base and the services 805, 806 are separately acquired and contractual obligations usually prevent their modification. The SDAL 818 is therefore subsequently interposed between the services 805, 806 by a third party "integrator" into an architecture that is already in place. The integrator creates both the database clients 820-822 and the wrappers 830-833. Also as discussed above, the actual situs of these components in the physical architecture of the service provider network 800 is not material although implementation specific details may mitigate for certain placements.

Once the SDAL 818 (including the wrappers 830-833) and the database clients 820-822 have been integrated, when service provider network 800 restarts, the service provider network 800 first registers the database clients 820-822 and the wrappers 830-833, together with the data models they consume. For the database clients 820-822, the data model is determined by a sole key (not shown) in the key-value pair, and for the wrappers 830-833, the consumed data model is determined by are the inbound data. The service provider network 800 also registers the data model data model they produce. For the database clients 820-822, the data model they produce is the underlying, database data model and for the wrappers 830-833 the data models they produce are the outbound data.

Once the wrappers 830-833 and the database clients 820-822 are registered, the service provider network 800 loads the services 805, 806. At initialization, the services 805, 806 prepare the Subscriber Data Queries (not shown) that the services 805, 806 will execute later at run time. In this preparation phase, SDAL 818 performs a process in which it traverses the graph linking the services 805, 806 to the database clients 820-822 through the wrappers 830-833, in order to find the most efficient path. The most "efficient" path is usually the shortest one. The SDAL 818 then outputs the executable sequence for making requests to the selected database clients 820-822, runs the selected wrappers 830-833, and finally feeds the service data model 810.

The illustrated embodiment also implements this process in Java, and more particularly a Java Bean reflection. More particularly, this embodiment employs the "reflection" feature that is available in Java. This reflection features permits allows an executing Java program (e.g., a Java bean) to examine or "introspect" upon itself. Reflection permits the Java Bean to obtain the names of all its members and display them. It is also used in the illustrated embodiment for Object mapping of the various data models that might be encountered However, the subject matter claimed below disclosed herein is not so limited. Alternative embodiments may choose to use, for example, on-the-fly Java code generation and compilation technique.

The service provider network 800 then runs the services 805, 806 for processing service requests. At this stage the queries built in the previous step are executed without any algorithmic overhead and with much increased performance. The use of the SDAL 818 and database clients 820-822 also facilitates other "optimizations". For example, in conventional practice, difficulties arise when two different services try to access the same database for the same data through their wrappers. This causes significant overhead on the application server, the database system and the network in between. The illustrated embodiment resolves these issues by permitting the caching in a single place the data fetched from database for a certain time. Thus, where two services try to access the database, the conflict can be addressed by caching data for only the few milliseconds required to execute both services.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art. The process and operation require physical manipulations of physical quantities that will physically transform the particular machine or system on which the manipulations are performed or on which the results are stored. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "accessing", "computing," "calculating," "determining," "displaying," and the like.

Furthermore, the execution of the software's functionality transforms the computing apparatus on which it is performed. For example, acquisition of data, will physically alter the content of the storage, as will subsequent processing of that data. The physical alteration is a "physical transformation" in that it changes the physical state of the storage for the computing apparatus.

Note also that the software implemented aspects of the technique disclosed herein are usually encoded on some form of program storage medium or implemented over some type of transmission medium. The program storage medium, is a non-transitory medium and may be magnetic (e.g., a floppy disk or a hard drive) or optical (e.g., a compact disk read only memory, or "CD ROM"), and may lee read only or random access. Similarly, the transmission medium may be twisted wire pairs, coaxial cable, optical fiber, or some other suitable transmission medium known to the art. The technique is not limited by these aspects of any given implementation.

This concludes the detailed description. The particular embodiments disclosed above are illustrative only, as examples described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the appended claims. Accordingly, the protection sought herein is as set forth in the claims below.

What is claimed is:

1. A method for providing a subscribed service, comprising:
    establishing a service provider network, wherein the service provider network comprises a first service of a plurality of services and a second service of the plurality of services, and wherein the first service corresponds with a first data model;
    receiving a service request at the first service;
    accessing, at a subscriber data abstraction layer of the service provider network, subscriber data, wherein:
        the subscriber data abstraction layer is interposed between the plurality of services and a subscriber database,
        the subscriber database stores the subscriber data,
        the subscriber data abstraction layer comprises a plurality of wrappers and a database client corresponding with the subscriber database,
        the plurality of wrappers comprising a first wrapper to convert the first data model to a second data model and a second wrapper to convert the second data model to a third data model, and
        the database client produces the third data model corresponding with the subscriber database; and
    processing the service request using the accessed subscriber data, wherein a service response is provided in accordance with the first data model converted from the second data model by the first wrapper and the third data model by the second wrapper.

2. The method of claim 1, wherein processing the service request includes:
    determining that the service request is authorized from the accessed subscriber data; and
    in response to determining that the service request is authorized, authorizing the service request.

3. The method of claim 1, wherein accessing the subscriber data includes accessing a subscriber profile and an attachment to the subscriber profile.

4. The method of claim 2, wherein the database client consumes a data model that is a key of a key-value pair contained in the database client and produces a data model of the subscriber database.

5. The method of claim 2, wherein the plurality of wrappers, the third data model exposed by the database client, and the service are represented as Java beans.

6. The method of claim 1, further comprising:
    caching the accessed subscriber data; and
    fulfilling a second service request using the cached subscriber data.

7. The method of claim 1, wherein the subscriber data abstraction layer traverses a graph linking the plurality of services with a plurality of database clients through the plurality of wrappers to find a shortest path.

8. The method of claim 1, wherein the subscriber data abstraction layer comprises the plurality of wrappers and a plurality of database clients, wherein each of the plurality of database clients correspond with a different model, including the first data model and the second data model.

9. A service provider network for providing subscribed service, comprising:
    a processor;
    a memory;
    a subscriber database containing subscriber data;
    a subscriber data abstraction layer, wherein:
        the service provider network comprises a first service of a plurality of services and a second service of the plurality of services,
        the first service corresponds with a first data model, and
        the subscriber data abstraction layer is interposed between the plurality of services and the subscriber database; and
    wherein the service provider network is configured to:
        receiving a service request at the first service;
        access, at the subscriber data abstraction layer, the subscriber data from the subscriber database, wherein:
            the subscriber data abstraction layer comprises a plurality of wrappers and a database client corresponding with the subscriber database,
            the plurality of wrappers comprising a first wrapper to convert the first data model to a second data model and a second wrapper to convert the second data model to a third data model, and
            the database client produces the third data model corresponding with the subscriber database; and
        process the service request using the accessed subscriber data, wherein a service response is provided in accordance with the first data model converted from the second data model by the first wrapper and the third data model by the second wrapper.

10. The service provider network of claim 9, wherein:
    the first wrapper consumes the first data model of the inbound data and produces the second data model of the outbound data; and the database client consumes the second data model that is a key of a key-value pair contained in the database client and produces the third data model of the subscriber database.

11. The service provider network of claim 9, wherein the first wrapper, the second data model exposed by the database client, and the first service are represented as Java beans.

12. The service provider network of claim 9, wherein the method further comprises:
caching the accessed subscriber data; and
fulfilling a second service request using the cached subscriber data.

13. The service provider network of claim 9, wherein processing the service request includes:
determining that the service request is authorized from the accessed subscriber data; and
in response to determining that the service request is authorized, authorizing the service request.

14. The service provider network of claim 9, wherein accessing the subscriber data includes accessing a subscriber profile and an attachment to the subscriber profile.

15. A service provider network, comprising:
a first service of a plurality of services, and wherein the first service corresponds with a first data model;
a plurality of subscriber databases, wherein a first subscriber database defines a second data model for storing subscriber data;
a plurality of database clients, wherein a first database client corresponds to the first subscriber database, wherein the first database client produces the second data model of the first subscriber database; and
a subscriber data access layer interposed between the plurality of services and the plurality of subscriber databases, wherein:
the subscriber data access layer comprises a plurality of wrappers, wherein the first wrapper converts the first data model to a second data model, and a second wrapper to convert the second data model to a third data model corresponding with the first database of the plurality of subscriber databases; and
the first service request is processed using the subscriber data from the first subscriber database, wherein a service response is provided in accordance with the first data model converted from the second data model by the first wrapper and the third data model by the second wrapper.

16. The service provider network of claim 15, wherein the plurality of database clients each consume a data model that is a key of a key-value pair contained in each database client and produces a data model of the respective subscriber database.

17. The service provider network of claim 15, wherein the plurality of wrappers, the data models exposed by the database clients, and the services are represented as Java beans.

18. The service provider network of claim 15, wherein the method further comprises:
caching the accessed subscriber data; and
fulfilling a second service request using the cached subscriber data.

19. The method of claim 15, wherein accessing the subscriber data includes accessing a subscriber profile and an attachment to the subscriber profile.

* * * * *